United States Patent Office 3,336,426
Patented Aug. 15, 1967

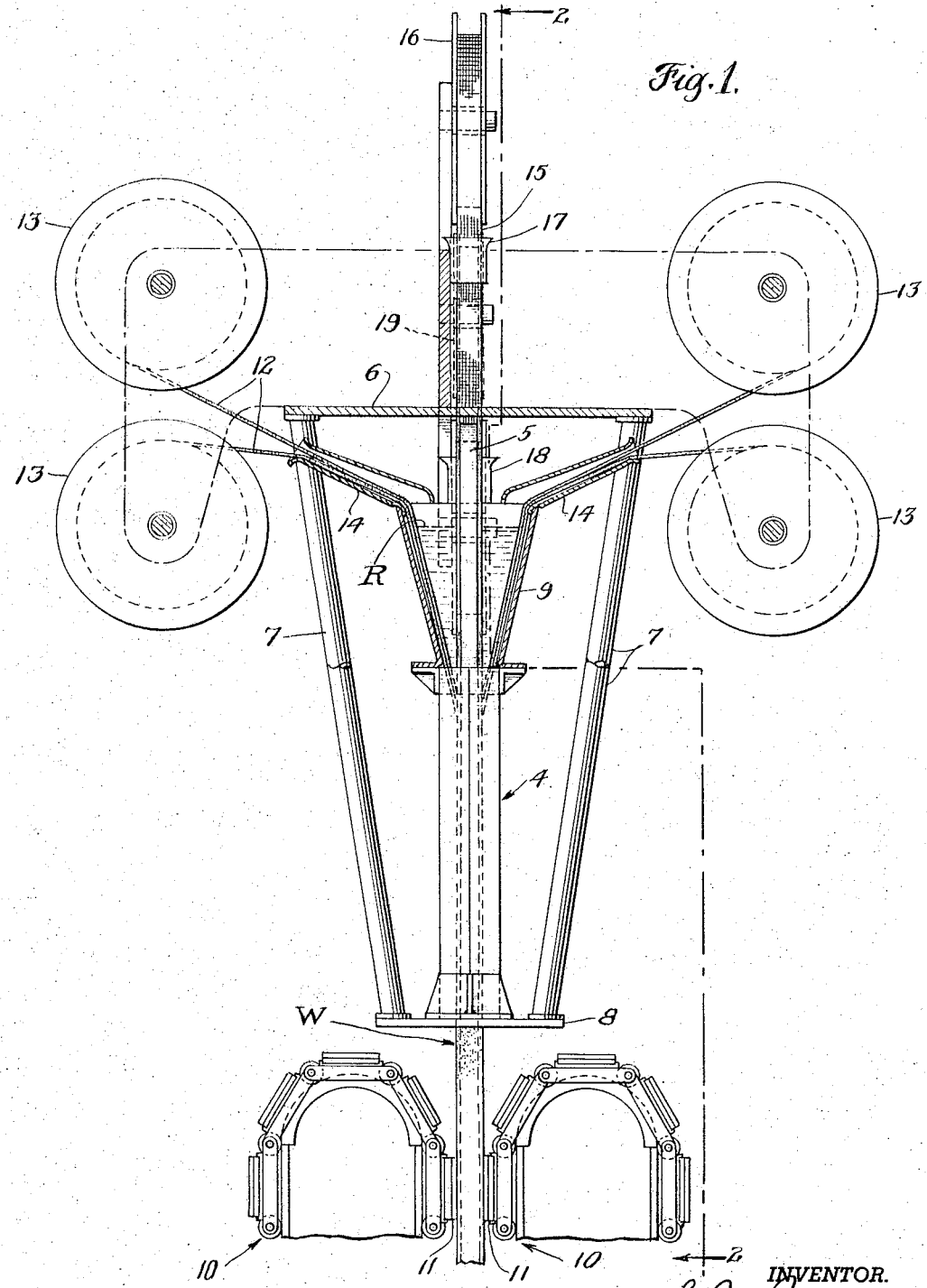

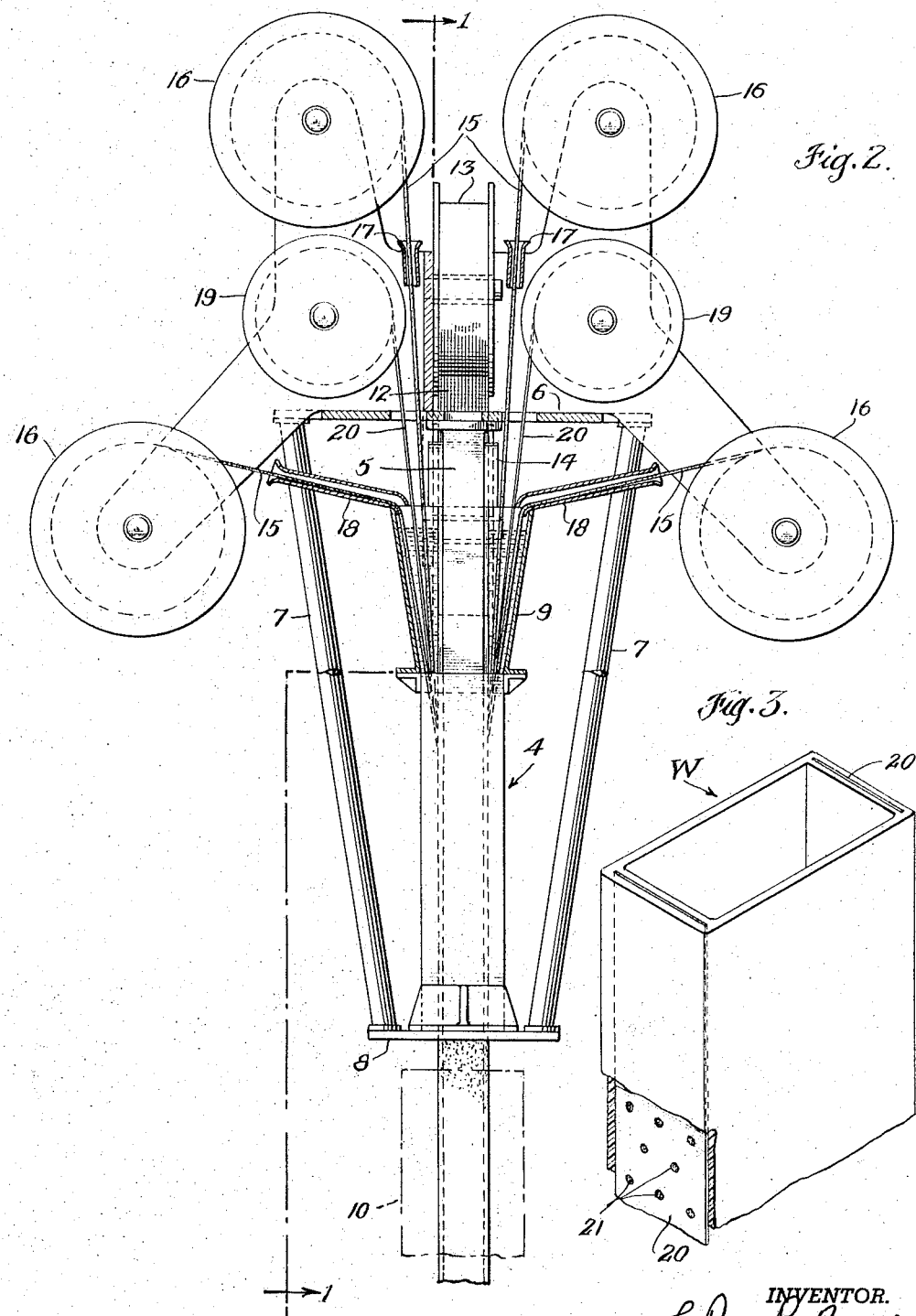

3,336,426
METHOD OF PRODUCING REINFORCED
PLASTIC ARTICLES
Le Roy R. Boggs, Bristol, Tenn., assignor to Universal
Moulded Fiber Glass Corp., Bristol, Va., a corporation
of Delaware
Filed Mar. 26, 1963, Ser. No. 268,119
5 Claims. (Cl. 264—137)

The present application is a continuation-in-part of my application Ser. No. 2,760, filed Jan. 15, 1960, now abandoned, which has been refiled under Ser. No. 408,488, Nov. 3, 1964.

This invention relates to the production of certain improved reinforced plastic articles.

Although various features of the invention are pertinent to reinforced plastic articles of a variety of types, the invention is of particular importance in connection with articles or pieces in which strength and rigidity are of importance, especially various types of structural members.

As already noted, the invention is concerned with a method of producing articles or products composed of reinforced plastic or resin materials. By way of example, the invention is concerned with articles composed of resin reinforced with fibrous materials, advantageously glass fiber reinforcements in the form of rovings, or of mats of random fibers, or of woven strips, or combinations of these reinforcements. According to the invention the reinforcement employed in the improved articles of this invention, and also in the method for making such articles, includes not only the fiber reinforcement elements but also certain metallic elements associated with the fiber reinforcements and disposed in the articles in a novel manner as will further appear.

One of the primary objectives of the invention is to provide a method of making an article, for instance a structural member, having increased flexural rigidity and unusually high effective modulus of elasticity. In the preferred embodiment of the invention this is accomplished by incorporation of a metal reinforcement element, or a plurality of such elements, in the form of metal strips, for instance steel strips, so arranged with respect to the fibrous reinforcement elements and so disposed in the article as to contribute a high degree of rigidity especially in certain planes, as will further appear.

Another object of the invention is to provide a method for introducing the metal reinforcements, which method is adapted to continuous operation, by the passage of a thermosetting resin and the reinforcing elements through a forming passage in which heat is applied to solidify the resin while moving through the forming passage. In the preferred technique for producing articles of the kind referred to according to the invention, the metal strip or strips are fed into and through the forming passage along with the fibrous reinforcement elements employed, the metal strips being sandwiched between layers or plies of fibrous reinforcement and the fibrous reinforcement layers lying adjacent to the surfaces of the passage so as to sweep or wipe resin material therefrom, especially in the zone in which solidification is occurring.

How the foregoing and other objects and advantages of the invention are attained will be clear from the following description referring to the accompanying drawings illustrating the invention as embodied in a structural member of hollow rectangular form and a technique for making such a structural member, and in which:

FIGURE 1 is a simplified side elevational view of an apparatus for making a hollow structural member, this view being taken as indicated by the line 1—1 on FIGURE 2;

FIGURE 2 is a view similar to FIGURE 1 but taken at right angles to FIGURE 1 as indicated by the line 2—2 on FIGURE 1; and FIGURE 3 is an isometric fragmentary view of a piece of a structural member adapted to be made by the equipment of FIGURES 1 and 2, FIGURE 3 also having a portion broken out to show one of the metal strip reinforcement elements within.

In considering the drawings it is first to be noted that although the invention is of wide applicability, that is, may be embodied in products of many types, the invention for purposes of illustration is herein described as embodied in a structural member in the form of a hollow or tubular beam or the like of rectangular section, for instance a piece measuring about two inches by four inches and of any desired or convenient length, the method of the invention being capable of producing articles continuously and thus of indefinite length. In a typical case the article formed may be cut off at desired lengths, for structural purposes, for instance from a foot or two up to 15 or 20 feet in length. A portion of such a piece is indicated generally by the letter W in FIGURE 3.

In the making of the piece W, for instance by the equipment shown in FIGURES 1 and 2, a foaming device is employed, such a device being indicated at 4 and having therein a generally vertical forming passage with the entrance end at the top and the discharge end at the bottom. This forming passage has a cross section throughout most of its length conforming with the outside configuration and dimensions of the piece W. Within the forming passage a core 5 is suspended, this core conforming in shape and dimensions to the interior hollow of the piece W, and the core being extended substantially throughout the vertical length of the forming passage in the device 4. The core may be mounted at its upper end by means of the mounting plate 6 which is supported by means of supporting structure such as shown at 7. At the lower end of the structural supporting members a mounting plate 8 is also provided, this plate serving to mount the forming device 4.

Toward its upper end, as plainly seen in both FIGURES 1 and 2, the forming passage in the forming device is flared to an enlarged inlet and entrance opening, and immediately associated with the upper or entrance end of the forming device 4 is a resin reservoir or pan 9 adapted to receive a charge of liquid thermosetting or heat curing resin, the level of which is indicated at R.

Below the discharge end of the forming device 4 a puller mechanism is arranged, this mechanism preferably including a pair of crawler treads generally indicated at 10—10, each carrying gripping shoes 11 adapted to frictionally engage the formed and solidified piece W upon discharge thereof of the lower end of the forming passage. These crawler tread devices or puller mechanism serve to grip and pull on the solidified piece so as to advance the materials into and through the forming passage.

The foregoing general arrangement of equipment conforms with the disclosure of my copending application 169,908 filed Jan. 30, 1962. Not all details of the mounting of the crawler puller mechanisms or of the forming device and resin pan are illustrated herein, but reference may be made to said copending application for some of the detailed parts which form no part of the present invention per se. It is further mentioned that heating and cooling passages are preferably also provided both in the forming device and also in the core 5, for instance in the manner disclosed in said copending application, but the details of these parts need not be considered herein, although it is to be noted that the entrance end portion of the forming passage, especially in the tapered inlet end, is desirably cooled to prevent setting of the resin in that region, and at least the mid portion of the forming device 4 and core 5 are heated to a temperature sufficient to cure or set the resin as it is passing through the forming passage.

For purposes of the present invention, in the production of a piece such as the piece W, various plies of fibrous reinforcement or strips for instance mats of random fibers, are fed downwardly through the resin in the resin pan 9 and thence into the various parts of the forming passage adapted to form various parts of the wall of the article being formed. For example as viewed in FIGURE 1, two fibrous strips 12 are fed from reels 13 at each side of the apparatus as viewed in FIGURE 1 through guides 14 into the upper end of the resin pan 9 so as to pass downwardly through the resin and thus become impregnated with the resin and thereby carry the resin downwardly into the entrance end of the forming passage. Similarly in the other plane, as shown in FIGURE 2, pairs of fibrous strips 15 are fed from supply reels 16 at each side of the equipment as viewed in FIGURE 2, the inner of these strips 15 passing through guides 17 and the outer ones passing through guides 18, all of the strips 15 however being delivered into the upper end of the reservoir 9. Although various of these fibrous strips may desirably be arranged to overlap with each other around the article as disclosed for instance in the copending application above referred to, each of the strips may if desired lie only in a single wall of the article, as is shown in FIGURES 1 and 2. In any event it is contemplated according to the present invention to introduce between at least certain of the pairs of strips or plies additional reinforcement elements in the form of metal strips.

Thus, in FIGURE 2 it will be seen that a pair of supply reels 19 for metal strips are provided as sources of supply for metal strips 20 which are fed between the inner and outer fibrous reinforcement strips 15 at each of two opposite sides of the rectangular article being formed. In the case of the hollow rectangular structural member of the kind shown in FIGURE 3 and described above, these metal strips 20 are desirably positioned flatwise in the two opposite narrow walls of the rectangular piece, this positioning being highly effective in increasing the flexural rigidity of the article, especially about an axis normal to the wider walls of the rectangular shape.

The effect of the metal strips is enhanced by providing apertures in the strips as indicated at 21 in FIGURE 3, such apertures being infilled by the resin material during the forming operation and thus effectively keying the resin material to the metal strips. As an alternative or in addition to the apertures, the metal strips may be provided with surface irregularities obtained for example by etching the surfaces.

In the technique as described above and as illustrated in FIGURE 2, the fibrous reinforcement strips and the intervening metal strips are fed downwardly through the resin in the resin pan 9 and into the tapered entrance end of the die in the form of sandwiches, i.e., each metal strip lies between a pair of fiber reinforcement strips. As the strips move downwardly through the resin pan, the "sandwich" picks up the resin, the fiber strips being thoroughly impregnated by passing through the resin, and the tapered inlet portion of the forming device tends to compress the impregnated reinforcement, thereby squeezing out air and providing complete encasement in the region of the metal strips, as well as flow of the resin into the apertures or into other irregularities of the strips, such as the surface markings above referred to. In the central portion of the forming passage, heat is applied and the article being formed is solidified. The article is discharged from the forming device in hardened or solidified condition and is gripped by the gripping devices 11 of the puller mechanism, these gripping devices and the action of the crawler treads 10 serving to pull the formed piece from the forming passage and also to pull the reinforcement elements downwardly through the resin pan and into the upper end of the forming device.

By virtue of the action described above, the surfaces of the forming device are constantly being swept clean of hardening resin by the action of the fibrous reinforcement strips in contact therewith. The technique of the invention therefore provides for introduction of the metal strips while maintaining the metal strips out of contact with the walls of the forming passage.

The foregoing provides an effective technique for producing articles incorporating metal reinforcement strips in an article or wall of substantial width as compared with the thickness thereof, and this is applicable to a wide variety of products incorporating such a wall.

The particular type of article, namely a structural member in connection with which the invention is described above and illustrated in the drawings, is an especially advantageous embodiment of the invention, because of the high effective modulus in elasticity attainable in this way. In considering the increase in flexural rigidity secured in a piece of the kind illustrated in FIGURE 3 of dimensions such as those described above, it is pointed out that the use of steel strips weighing as little as 2% of the entire piece results in as much as 35 to 40 percent increase in flexural rigidity about an axis normal to the two opposite wider walls of the rectangular shape.

I claim:

1. A method for making a resin article of elongated shape and having a wall of substantial width as compared with the thickness thereof, which method comprises feeding to a forming passage of shape conforming with the cross section of the elongated article being formed a sandwich of at least two fibrous reinforcement strips with a metal strip therebetween, the fibrous reinforcement strips being impregnated with a heat hardenable resin material and the metal strip being fed to the forming passage axially thereof and in position to enter flatwise into that part of the forming passage providing for formation of said wall of the article of substantial width as compared with its thickness, heating the resin material to harden it while it is in the forming passage, and pulling on the hardened article with the metal strip therein beyond the discharge end of the forming passage to advance the resin material and strips through the forming passage.

2. A method according to claim 1 in which the metal strip has portions distributed therealong configured to mechanically interlock with resin hardened in contact therewith.

3. A method for making a hollow elongated resin article comprising feeding to a tubular forming passage conforming with the cross section of the article being formed a plurality of reinforcing elements including at least two layers of fibrous reinforcement impregnated with a heat hardenable resin material, feeding into said passage a metal strip reinforcement element, said metal strip being fed axially through said passage in a position between said impregnated fibrous layers, heating the resin material to harden it while it is in the forming passage, and pulling on the hardened article beyond the discharge end of the forming passage to advance the resin material, fibrous layers and metal strip through the forming passage.

4. A method for making a hollow elongated structural member of angular cross section, said method comprising the steps of claim 3 and further comprising feeding at least two layers of fibrous reinforcement in each of two opposite parallel walls of the structural member and feeding parallel metal strips between the fibrous layers in each of said opposite walls, the method further being characterized by effecting pulling of the article by gripping pressure applied to opposite outer sides of the hardened hollow article beyond the discharge end of the forming passage, the gripping pressure being applied in a direction edgewise in relation to the metal strips in the article.

5. A method for making a resin article of elongated shape and having a wall of substantial width as compared with the thickness thereof, which method comprises feeding from separated supply sources at least two layers of fibrous reinforcement in convergent paths through a body of liquid heat hardenable resin material to impregnate the layers of fibrous reinforcement with said liquid resin material, feeding a metal strip through said body of resin in a path between the convergent fibrous layers, jointly feeding the impregnated fibrous layers and the interposed metal strip directly from the body of resin into a forming passage conforming with the cross section of said wall of the article, heating the resin material to harden it while it is in the forming passage, and pulling on the hardened article with the metal strip therein by gripping the article beyond the discharge end of the forming passage.

References Cited
UNITED STATES PATENTS

| | | | |
|---|---|---|---|
| 2,624,073 | 1/1953 | Pugh | 264—173 |
| 2,871,911 | 2/1959 | Goldsworthy et al. | 156—441 |
| 2,940,885 | 6/1960 | Burke | 161—176 |
| 2,963,716 | 12/1960 | Norehad | 161—176 |
| 3,038,202 | 6/1962 | Harkenrider | 18—14 |
| 3,051,995 | 9/1962 | Ferrell et al. | 264—173 |
| 3,104,421 | 9/1963 | Park | 18—14 |

ROBERT F. WHITE, *Primary Examiner.*

ALEXANDER H. BRODMERKEL, *Examiner.*

F. MARLOWE, J. A. FINLAYSON,
*Assistant Examiners.*